United States Patent [19]
Bonke

[11] Patent Number: 6,158,812
[45] Date of Patent: Dec. 12, 2000

[54] INDIVIDUALLY ADAPTABLE HEADREST FOR SEATS WITH BACKS

[76] Inventor: Christoph Bonke, Wendelsteinstrasse 15, D-83126 Flintsbach, Germany

[21] Appl. No.: 08/913,640

[22] PCT Filed: Feb. 29, 1996

[86] PCT No.: PCT/DE96/00367

§ 371 Date: Feb. 11, 1998

§ 102(e) Date: Feb. 11, 1998

[87] PCT Pub. No.: WO96/28318

PCT Pub. Date: Sep. 19, 1996

[30] Foreign Application Priority Data

Mar. 13, 1995 [DE] Germany ................ 295 04 287 U

[51] Int. Cl.[7] .................................................... A47C 7/36
[52] U.S. Cl. .................. 297/391; 297/216.12; 297/397
[58] Field of Search ................ 297/216.12, 216.13, 297/216.14, 397, 391; 280/730.1, 730.2

[56] References Cited

U.S. PATENT DOCUMENTS

| | | | |
|---|---|---|---|
| 3,779,577 | 12/1973 | Wilfert | 280/730.1 |
| 4,440,443 | 4/1984 | Nordskog | 297/397 |
| 4,744,601 | 5/1988 | Nakanishi | 297/216.12 X |
| 5,133,084 | 7/1992 | Martin | 280/730.1 X |
| 5,290,091 | 3/1994 | Dellanno et al. | 297/216.12 |
| 5,499,840 | 3/1996 | Nakano | 280/730.1 |
| 5,580,124 | 12/1996 | Dellanno | 297/216.12 |
| 5,630,651 | 5/1997 | Fishbane | 297/391 X |
| 5,694,320 | 12/1997 | Breed | 297/216.12 X |
| 5,833,312 | 11/1998 | Lenz | 297/216.14 X |

FOREIGN PATENT DOCUMENTS

| | | |
|---|---|---|
| 0113645 | 7/1984 | European Pat. Off. |
| 2395729 | 1/1979 | France. |
| 3042802 | 6/1982 | Germany. |
| 2246292 | 1/1992 | United Kingdom. |
| 2246292A | 1/1992 | United Kingdom. |

*Primary Examiner*—Peter M. Cuomo
*Assistant Examiner*—Stephen Vu
*Attorney, Agent, or Firm*—Domingue & Waddell, PLC

[57] ABSTRACT

A head restraint for seats with a seat back with an upper support body (1) which is provided in the extension of the seat back (3) above the upper edge (2) of the seat back (3) at head height, and with the longitudinal axis (6) aligned horizontally and parallel to the longitudinal axis (7) of the seat back (3), whereby the underside of the upper support body (1) is in contact with, or spaced apart from, the upper edge (2) of the seat back (3). At least two horizontally spaced apart structures (5) for lateral support of the head are provided at the front (9) of the upper support body (1) and/or integrated into it. At the height of the cervical lordosis of a seated person a lower, essentially cylindrical support body (4) for supporting the cervical spine is attached; when viewed from the side, the cross-section of the said support body (4) is essentially round, oval, elongated or semicircular in shape, and the longitudinal axis (13) of the said support body (4) is aligned horizontally and parallel to the longitudinal axis (6) of the upper support body (1).

17 Claims, 8 Drawing Sheets

INDIVIDUALLY ADAPTABLE HEADREST FOR SEATS WITH BACKS

FIELD OF THE INVENTION

The present invention concerns an individually adaptable head restraint for seats with a seat back with the characteristics stated in the precharacterising part of claim 1.

BACKGROUND ART

From prior art, a head restraint for a seat in a motor vehicle is known which comprises an essentially cylindrical support body. The longitudinal axis of the support body is aligned horizontally and is arranged parallel to the upper edge of the seat back.

The support body is kept in position in respect of the seat back by means of one or two guide rods protruding vertically from the upper edge of the seat back; the said guide rods engage the lower side of the support body. Anchoring of the upper ends of the guide rods in the cylindrical support body is designed in such a way as to allow inclination of the support body in, or opposed to, the direction of travel. The guide rods can be lowered into the seat back or they can be partly pulled out from the seat back, thereby providing height adjustability of the support body.

Such a head restraint has numerous disadvantages.

It is particularly disadvantageous that the neck/head region is neglected from an orthopaedic point of view. If the vehicle is brought to an abrupt halt, for example by a frontal obstruction, there is a whiplash-like swinging of the head or the torso, in longitudinal direction of the vehicle. At the end of the backward whiplash-movement, the head hits against the support body.

In this, due to a very small impact surface, on the one hand very considerable G-forces impact on the brain, which can lead to cerebral haemorrhages. On the other hand it is frequently observed that during the whiplash-like forward movement, the driver is at least somewhat lifted out of his/her seat. During the whiplash movement directed backward, this results in the cylindrical support body engaging not primarily at the head but too low, at the transition region between head and neck. Consequently, backward overstretching of the neck occurs. The subsequently occurring symptoms are referred to as cervical-spine whiplash trauma.

The use of such a known head restraint causes cervical-spine whiplash trauma even in cases of rear-end collisions onto a stationary vehicle.

If the rear-end collision happens while the head is turned aside, then additionally, pronounced torsional bending of the cervical spine occurs. This regularly causes irreparable damage to the cervical spine.

If the vehicle is hit laterally, for example at a 90° angle, the head will be tossed about by the forces acting upon it.

Since such injuries as a rule are associated with high treatment costs and at least a 2- to 3-week absence from the workplace, they represent a considerable burden on the national economy.

If the passenger is asleep, then his/her head swings about in an uncontrolled fashion, depending on the shaking of the vehicle and the centrifugal forces. At best, this leads to tenseness of the neck muscles which often leads to headaches and thus to premature fatigue as well as a reduced ability to concentrate.

If the cylindrical support body is in the highest position, as is required in the case of a driver of above-average height, this leads to a large-area gap between the upper edge of the seat back and the underside of the support body. This gap is often associated with draught problems.

A further disadvantage of the known head restraints is the lack of comfort which, during long drives irrespective of draught problems and unintentionally acting acceleration forces, causes muscle tenseness in the upper shoulder and neck region, leading to premature fatigue, limited ability to concentrate, or even headaches and cervical migraines.

GB-A 2 246 292 describes a head-support cushion comprising a cloth pulled rearward over the seat back; at the front of this cushion there is a U-shaped element for supporting the back of the head.

Such a headrest has for example the disadvantage of allowing lateral swinging-through of the cervical spine, in particular during a transverse rebound movement of the torso. This lateral swinging-through of the cervical spine very frequently leads to the cervical spine whiplash-trauma (cervical spine syndrome) which is much feared also for economic reasons.

DE-A1-3042802 discloses a support for the back of the head with a horizontally-adjustable head-support surface located at the top. The adjustable head-support surface is connected to the seat frame by way of flexible tubes or by a joint-type mechanism. If substantial forces are encountered, for example forces consistent with bumping the head as a result of an accident, then the adjustable head-support surface is pushed into its rear position. In this case, direct introduction of force into the frame takes place.

Such a head restraint does not counteract any swinging-through of the cervical lordosis or any rebound movement during a bump as a result of an accident.

EP 0113645 describes a head restraint with a hoop in the shape of an inverted U. In the space between the straight sections of the U-shaped loop, a cushion is fixed in a vertically hingeable way. If the head restraint is moved to the upper position, the cushion hangs steeply downwards and rests against the bar-shaped vertical retainers of the head restraint. By contrast, if the head restraint is moved to the lower position, the hingeable cushion rests flat against the upper rim of the seat back.

The swivellable cushion of this head restraint comprises a flat, plane surface and as a result does not counteract any lateral swinging-through of the cervical lordosis during any rebound movement of the torso as a result of a collision.

OBJECTS AND SUMMARY OF THE INVENTION

It is thus the object of the present invention to provide a head restraint which even with forces impinging on a vehicle obliquely, effectively counteract the occurrence of cervical-spine whiplash trauma; which, during frontal collision of a vehicle as well as during rear-end collision, prevents cervical-spine whiplash trauma; which, in the case of a frontal collision or a rear-end collision where the head is turned aside, counteracts torsional strain on the cervical spine; which during lateral collision excludes tossing about of the head; which in the case of the head hitting this head restraint reduces the danger of cerebral haemorrhage as a result of excessive G-forces; which prevents unintended swinging around of the passenger's head while s/he is asleep; which avoids draught problems as a result of air circulation; which provides effective protection for the head and neck in the case of a vehicle roll-over; which, by avoiding the above-mentioned injuries leads to significant national economic savings; which provides increased comfort, avoids tension in the neck and shoulder region and thus allows fatigue-free and concentrated driving and which is economical to produce.

According to the invention, this object is met, in the case of a generic head restraint, by the characteristics disclosed in the characterising portion of claim 1.

According to the invention, this object is met, in the case of a generic head restraint, by the characteristics disclosed in the characterising portion of claim 1. Particularly preferred embodiments are disclosed in the dependent claims.

A head restraint constructed according to the invention in particular has the advantage of supporting the head and neck region laterally as well as from the rear. The position, and if need be, the shape of the individual support elements can be individually adapted to the seated person's anatomical features, in particular the shape of the skull and the cervical spine, if necessary while driving.

This leads to increased comfort. Tenseness of the neck and shoulder muscles is avoided. In particular in the case of laterally acting acceleration forces, the lateral stabilisation of the head and cervical spine area by means of activatable side supports has a positive effect. Whiplash trauma is counteracted by the lateral support elements, which if need be reach as far as the shoulders, and the headrest which, at least in the area of the back of the head, is of approximately hemispherical shape, or by a projecting part containing an airbag, above the head. Problems with draught are avoided by an activatable cervical lordosis support. If the upper frontal part of the head restraint is constructed in such a way that it extends forward, thus jutting out roof-like above the driver's head, then this also represents an effective head protection in case of vehicle roll-over.

BRIEF DESCRIPTION OF THE DRAWINGS

Particularly preferred embodiments are described in more detail by means of the diagrams. The following are shown.

DETAILED DESCRIPTION

Figure 1:
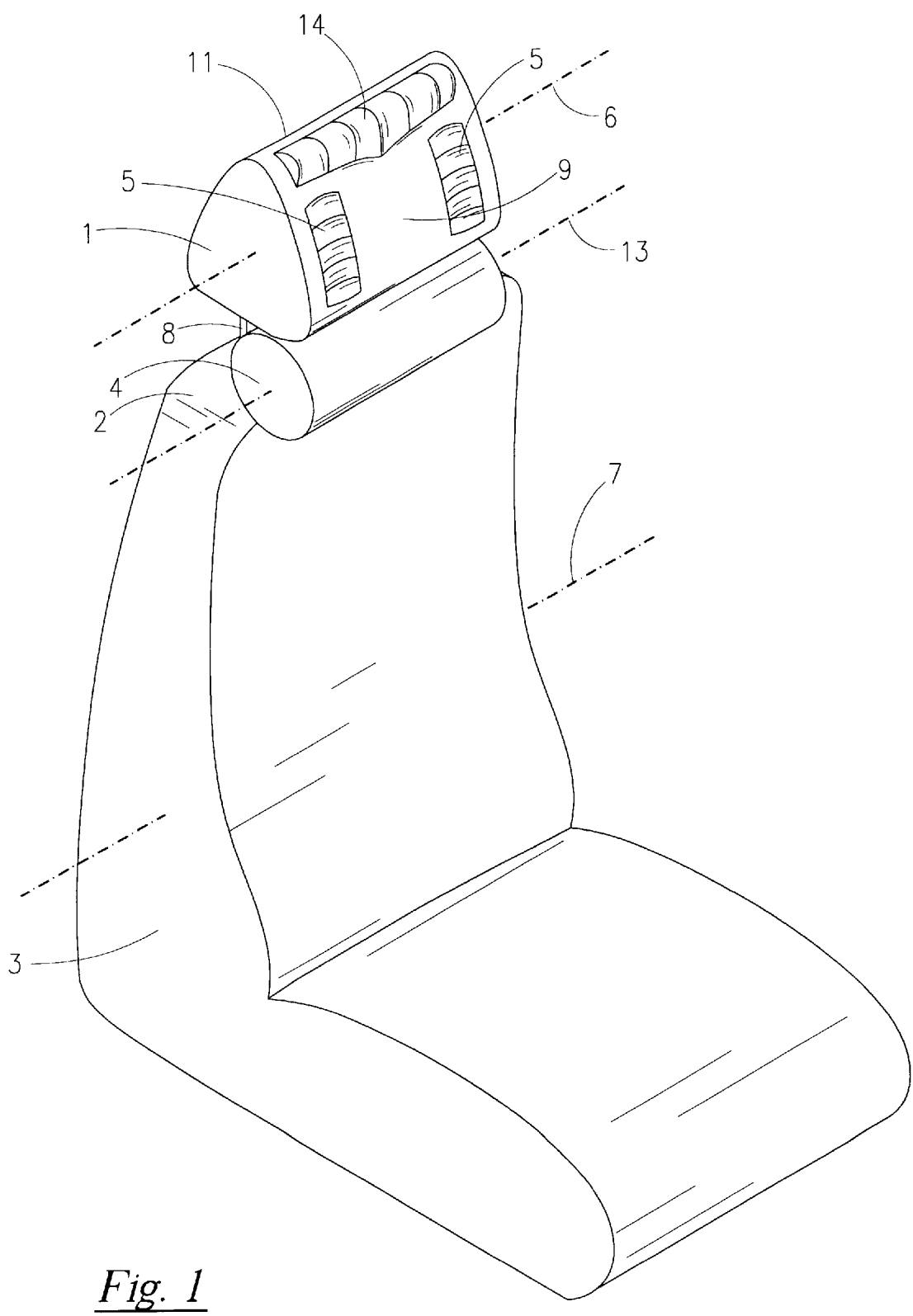
FIG. 1 a diagrammatic, perspective view of a head restraint according to the invention with its upper support body spaced apart from the upper edge of the seat back.

FIG. 1 shows a diagrammatic perspective view of a head restraint according to the invention, designed with a view to particularly simple and cost-effective manufacture as well as easy retrofitting.

This low-cost embodiment comprises at least one upper support body (1) for providing support from behind for the head, two lateral guides (5) which are provided at the front of the upper support body (1) and which provide lateral support for the head, as well as a lower support body (4) for supporting the cervical lordosis region.

The upper support body (1) which is essentially cylindrical, is located as an extension of the seat back (3) above the upper edge (2) of the seat back (3). The said support body (1) is preferably of round, oval, semicircular or rectangular cross section. If need be, the cross-sectional area can be essentially triangular. The longitudinal axis (6) of the cylindrical upper support body (1) is aligned horizontally and parallel to the longitudinal axis (7) of the seat back (3). The underside of the upper support body (1) can be in contact with the upper edge (2) of the seat back (3). This is in particular the case where the upper support body (1) is integrated in the upper part of the seat back (3). However, as a rule, the upper support body (1) is height-adjustably spaced apart from the upper edge (2) of the seat back (3). In this case the upper support body (1) is in connection with the seat back (3) by way of at least one holding element (8). Such a holding element (8) can be bar-shaped or tubular or comprise an essentially rectangular cross section. Essentially it protrudes vertically upwards from the upper edge (2) of the seat back (3) and enters upper support body (1) through the said support body's underside. The holding element (8) may be held in the seat back (3) and/or in the upper support body (1) in a vertically adjustable way. In particularly preferred embodiments, the upper extremity of the holding element (8) is connected to the upper support body (1) by way of a hinge mechanism, thus allowing inclination of the upper support body (1) at a right angle to the longitudinal axis (7) of the seat back (3).

Preferably, the upper support body (1) is adjusted by a manual, electric, hydraulic or pneumatic height adjustment mechanism at such a height that the point where the upper support body (1) and the back of the head touch, is located clearly below the upper end (11) of the upper support body (1); approximately in the area of the horizontal centre line (12).

At the front (9) of the upper support body (1) at least two means (5) are provided for lateral support of the head. As a rule, their basic shapes and fixing points are axially symmetrical in relation to the vertical centre line (10) of the front surface (9). When viewed from the front, their shape can for example be round, oval, elongated, rectangular or banana-shaped. Depending on the respective basic shape and dimensions, their arrangement on the frontal area (9) is selected in such a way that maximum lateral support of the head is attained with minimum restriction of seating comfort.

From a horizontal point of view the lateral guides (5) are preferably somewhat spaced apart from each other so that at least part of the rear of the head and/or the temporal region can be located between them. As already mentioned, they are usually at equal distance from, i.e. symmetrical to, the vertical centre line (10). If for example only two lateral guides (5) are provided at the frontal area (9) of the upper support body (1), then—when viewed from the front—the centre of gravity of their basic shapes is approximately at the height of the horizontal centre line (12) of the front (9) of the upper support body (1). If several lateral guides (5) are used, for example four, each of a round basic shape, then preferably at each side of the vertical centre line (11) and the horizontal centre line (12) there is the same number (for example two) of lateral guides (5). Such a pattern of arrangement is in particular preferred in cases where the contact point between the upper support body (1) and the rearmost part of the back of the head corresponds with the point of intersection of the vertical centre line (10) and the horizontal centre line (12).

In a particularly cost-effective embodiment, the lateral guides (5) can be solid plastic elements comprising the basic shapes already mentioned, for example made from foam material. They are at least somewhat elastic and can be contoured to a particular head shape by respective cutting-to-shape.

In somewhat more expensive embodiments, the lateral guides (5) are formed by hollow spaces, for example of the basic shapes mentioned above. By filling a gaseous, liquid or solid medium or mixtures of these, into the hollow space, the extent of the elevation and width of the respective lateral guide (5) can be exactly adjusted. This has the advantage that the lateral guides (5), even during driving, can be individually adjusted to various head shapes and can be withdrawn or extended as desired by the seated person.

Such lateral guides (5) for example comprise a somewhat rigid base of one of the basic shapes mentioned. Loosely placed on the rigid base is a film, very elastic in comparison to the said base. The external dimensions of this film are approximately the same as the rigid base and its edges are connected—if need be in a gas-proof way with the edges of the base. If a medium is filled into the space between the rigid base and the highly elastic film, by way of a connecting piece, if need be provided with a valve, then the highly elastic film bulges outward and thus forms the lateral guide (5).

If necessary, anchored retaining straps, elastic if need be, or wall reinforcements can be provided in order to avoid bulging in unintended places and in order to exactly define the shape of the expanded lateral guide (5). In a particularly preferred embodiment, the upper support body (1) comprises a central, frontal cavity (32) with the purpose of accommodating and supporting the rear of the head.

In order to fill the void with a medium, principally any type of pump can be used. Examples of pumps that may be used are impeller pumps of the radial, diagonal or axial type, dosing pumps, piston pumps, step piston pumps, diaphragm pumps, fluid entrainment pumps, forced draught pumps, rotary pumps (circulation pumps) such as centrifugal pumps or gear pumps, rotary piston pumps, press pumps, hose pumps, spindle pumps or spiral pumps, vacuum pumps such as vacuum piston pumps, wet-running vacuum pumps, Roots vacuum pumps, dry-running vacuum pumps, water ring vacuum pumps and vortex vacuum pumps. Those pumps (70, 71) are preferred which can also generate slight negative pressure. Electrically, pneumatically or hydraulically operated pumps are preferred because they allow convenient changing of the spatial shape of the respective chamber, even while driving, and because they can easily be accommodated in the seat back or centrally inside the head restraint. From the point of view of the most economical manufacture, in particular a hand-operated balloon-like pump is suitable, which among other applications is used for blood-pressure measuring devices. In this case it is easy to reduce the pressure within the lateral guide (5) by way of a screw-type valve at the ballon-like pump. Of course it is also possible to apply electrically operated pumps, pressure-gas cylinders or gas generators for filling the lateral guides (5).

It has been shown to be particularly advantageous to interconnect lateral guides (5), symmetrical to the vertical centre line (10), according to the principle of communicating tubes and to fill them via the same pump, the same pressure-gas cylinder or the same gas generator.

Figure 2:
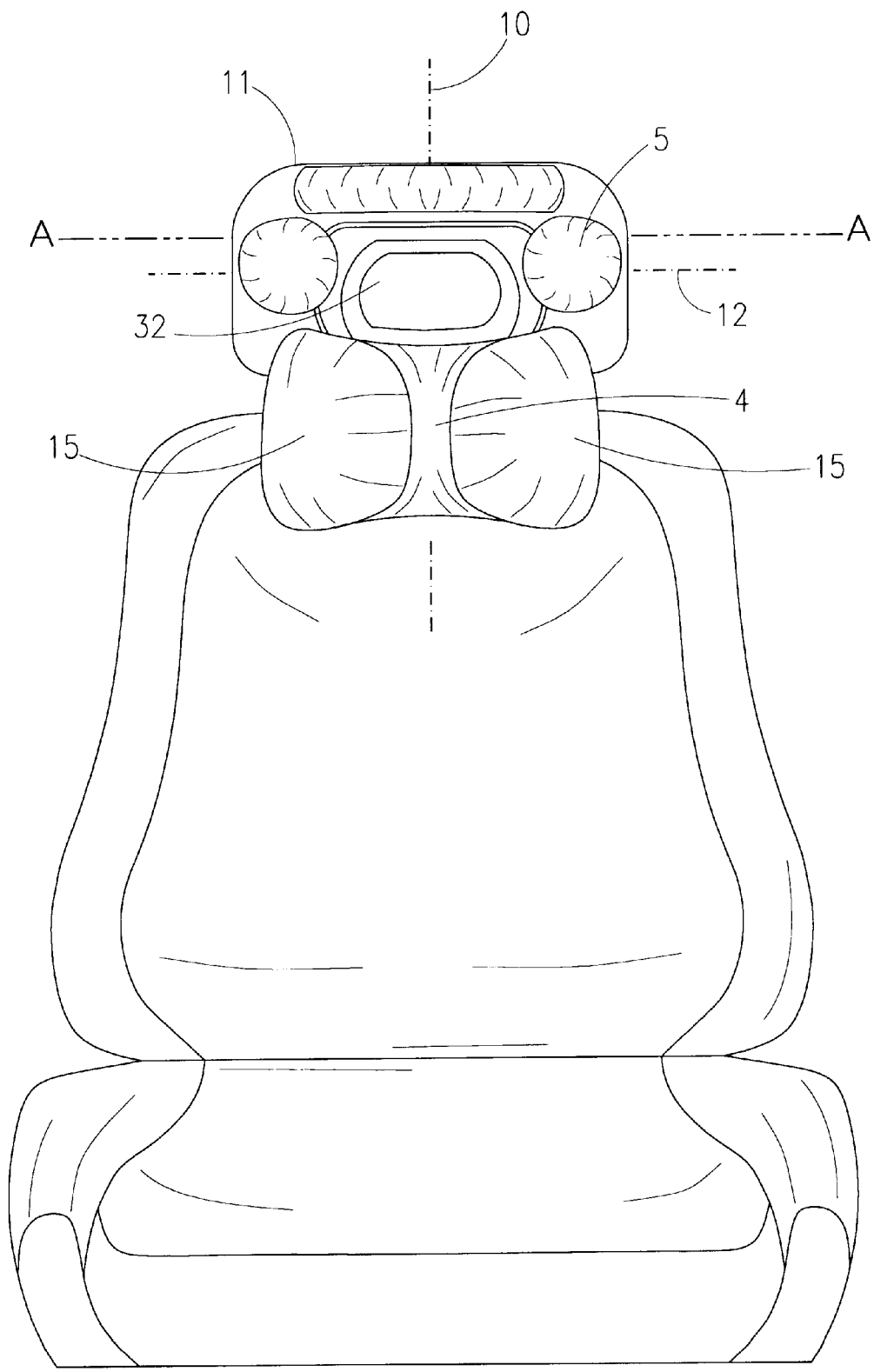
FIG. 2 a front view of a head restraint according to the invention, where the upper support body is in contact with the upper edge of the seat back.

FIG. 2 shows a particularly preferred embodiment of the head restraint according to the invention which at the front (9) of the upper support body (1) in addition to the lateral guides (5) comprises at least one projecting part (14) which is either permanent or which can be moved forward.

It emanates from the upper third of the upper support body (1), as a rule above the lateral guides (5). When viewed from the front, its basic shape is preferably an elongated rectangle. The longitudinal axis of this basic shape is aligned horizontally and parallel to the longitudinal axis (6) of the upper support body (1). The projecting part (14) faces forward, in the direction of travel; if need be, its front-end points slightly upward and in fully activated condition at least partially juts out roof-like above the head of the seated person.

If the vehicle rolls over, in this way, damage to the roof of the skull by contact with the car roof or with a brace in the vehicle roof, is avoided.

In the case of a frontal collision, there is a whiplash-like movement of the head. At the end of the backward whiplash-like movement, the head is to be intercepted by the upper support body (1) with the lateral guides (5).

However, as a rule, with prior-art head restraints, the upper edge of the horizontal support body interacts too low, in the region of the cervical lordosis. This results in a marked backward strain of the cervical spine. As a result, at the very least, cervical spine whiplash trauma is observed.

The projecting part (14), if it is inclined upwards accordingly, avoids this action of the upper edge of the upper support body (1) on too low a region of the cervical lordosis, by literally catching the head swinging back too high and gently guiding it back to the proper position, lower down. In this way, whiplash trauma caused by frontal or rear end collisions can simply and safely be avoided.

The projecting part (14) can be manufactured in one piece together with the upper support body (1) and can permanently jut forward bulge- or roof-like in the direction of travel.

The projecting part (14) is however preferably designed in such a way that it can be brought into its bulge- or roof-like final shape by filling with a liquid, gaseous or solid medium or with mixtures of these. In this case, the construction of the projecting part (24) can be selected analogously to the already mentioned construction of the lateral guides (5). The pumps, pressure-gas cylinders and/or gas generators mentioned there can also be used for filling the projecting part (14).

As can be clearly seen from FIGS. 1 and 2, a lower support body (4) for supporting the cervical lordosis spine is fitted to the lower end of the front (9) and/or at the front end of the underside of the upper support body (1). The said lower support body (4) is essentially cylindrical and has for example a round, oval, rectangular or semicircular cross-sectional shape. The longitudinal axis (13) of the lower support body (4) is aligned horizontally and parallel to the longitudinal axis (6) of the upper support body (1) and the longitudinal axis (7) of the seat back (3).

If the upper support body (1) is locked in a high-set position, then there is a gap between the upper edge (2) of the seat back (3) and the underside of the upper support body (1). As can be seen from FIG. 1, in this case the lower support body (4) is fitted in such a way that it at least partly adjoins the upper support body (1) and the upper edge (2) of the seat back (3), that is that it covers the gap and at the same time supports the curvature of the cervical lordosis.

Inter alia this leads to the significant advantage of avoiding any draught problems in the neck area, caused by circulating air in the vehicle interior. Tenseness in the neck and/or shoulder region, headaches and the resulting premature fatigue are thus avoided.

Figure 6:
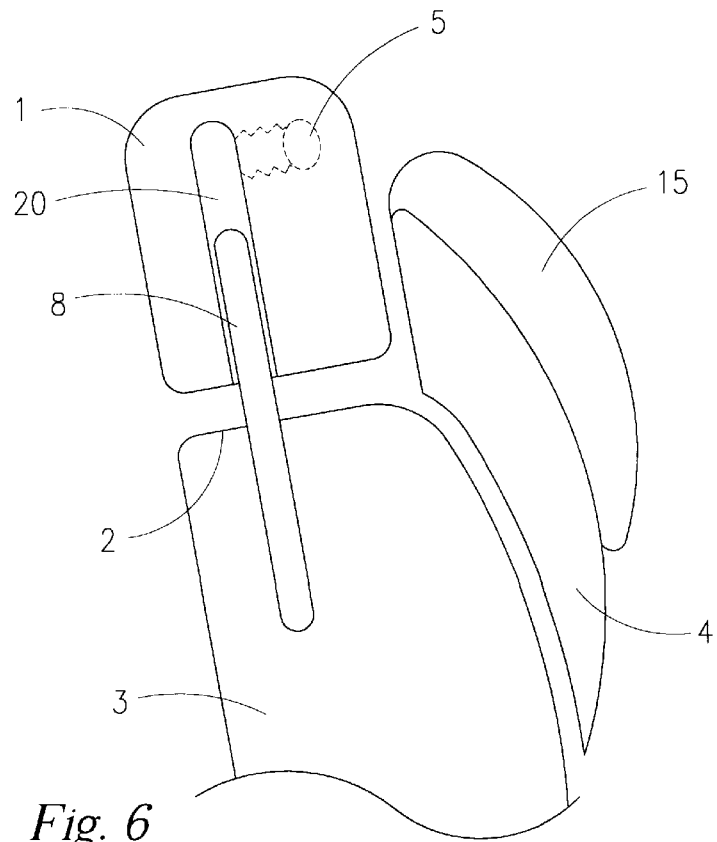
FIG. 6 a diagrammatic cross section along the vertical centre line in FIG. 2 of a head restraint according to the invention.

If the underside of the upper support body (1) is not spaced apart, or only slightly spaced apart upward, from the upper edge (2) of the seat back (3) (see FIG. 2), then the lower support body (4) is in particular arranged in such a way that it can support the curvature of the cervical lordosis. To this effect, the lower support body (4) at the front can at least partly protrude from the lower part of the upper support body (1) and/or the upper part of the seat back (3) (see FIG. 6). When viewed from the side, the cross-sectional area of the lower support body (4) in this case is preferably semi-circular in shape whereby the straight side is connected to the upper support body (1) and/or the back seat (3), while the curved side points forward in the direction of the cervical lordosis.

If the head restraint according to the invention is to be particularly cost-effective, then the lower support body (4) is manufactured for example from a solid body from an at least partially elastic material, for example foamed material.

Preferably, the lower support body (4) is however shaped in such a way that its expansion, in particular in the direction of the cervical lordosis of the person seated, can be individually adjusted even while driving. To this purpose, the lower support body (4) can for example be in the shape of an essentially cylindrical hollow space whose back is relatively rigid and whose front is elastic when compared to the back. If a liquid, gaseous or solid medium or a mixture of these is fed into the hollow space, then the elastic front bulges forward. As a result of the pressure of the filling medium, the lower support body (4) can be brought into any desired shape and can be exactly adapted to the anatomical features of the person seated. If necessary, within the lower support body (4), retaining straps fitted to the interior walls or wall reinforcements may be provided in order to avoid unintended bulging of the elastic front wall, and which hold the filled lower support body (4) in its desired shape.

In order to fill the lower support body (4), the same pumps, pressure-gas cylinders and/or gas generators are used as is the case with the lateral guides (5).

As has already been explained, if need be, the lower support body (4) serves to close the gap between the seat back (3) and the high-set upper support body (1). In particular, however, its task is to provide support for the cervical spine. This support of the cervical spine has the important advantage that during the backward whiplash-like movement of the torso, following a frontal collision of the motor vehicle, the cervical spine does not swing backwards and does not cause a dangerous nodding movement of the head.

In addition, the lower support body (4) reinforces the effect of the bulge- or roof-shaped projecting part (14) and thus significantly contributes to the prevention of whiplash trauma. During swinging back following a frontal collision, the torso wants to slide upwards along the seat back (3). At the end of this sliding movement, the upper edge of the upper support body tends to act upon too low a point in the neck area, thus causing a backward overextension of the cervical spine (whiplash trauma). By virtue of the lower support body (4) acting upon the curvature of the cervical lordosis and/or the shoulder region, this sliding movement is halted. If applicable, the roof-shaped projecting part (14), too, counteracts this sliding movement by gently holding the head down. A further advantage of the lower support body (4) is the associated significant increase in comfort both in the upright seat-back position and in the reclined position.

In a particularly preferred embodiment the lower support body (4), when viewed from above, is U-shaped, with the straight parts of the U pointing forward, essentially horizontally, and the curve of the U pointing in the direction of the seat back (3).

Alternatively or additionally to this, it is possible to provide lower lateral guides (15) on a straight, banana-shaped or U-shaped lower support body (4), which lateral guides (15) permanently protrude from the lateral areas of the frontal area (9) or which are activatable by filling. For these lower lateral guides (15) the details of the upper lateral guides (5) of the upper support body (1) apply analogously.

The advantage of an approximately U-shaped lower support body (4) or an essentially straight lower support body (4) with additional lower lateral guides (15) consists in the provision of lateral fixation of the cervical spine if lateral acceleration forces act upon the seat. In this way, the lateral fixation of the head by the upper lateral guides (5) of the upper support body (1) is supported and a significant contribution is made towards the prevention of torsion injuries and whiplash trauma.

In addition, a torso which is not swinging back exactly in the centre, is centred and placed upright by the (if applicable) at least somewhat laterally opened-up open sides of the U of the lower support body (4) and/or the lower lateral guides (15), so that the roof-shaped projecting part (14), the upper lateral guides (5) and the lower support body (4) can each be fully effective.

The activatable components of the head restraint according to the invention (upper lateral guides (5), upper projecting part (14), lower support body (4) and lower lateral guides (15)) can each be connected to various filling means. For example, each of these components can be connected to a separate balloon-like manual pump via a separate hose, whereby all the manual pumps may be grouped in a pump console with respective identification of the individual pumps. For example, the lateral area of the seat or the centre console of a vehicle is suitable for housing the pump console. It is also imaginable to house it at the free end of a bendable bar whose other end is anchored in the region of the centre console or the instrument panel.

Furthermore it is possible, instead of using a number of filling means (pumps, pressure-gas cylinders, gas generators) to use only a single filling means which can be connected to each of the activatable components directly or via a distributor valve, for example a rotary distributor valve, and via distributor lines connected to it. The distributor lines can be routed inside or beside the seat back (3).

A direct connection between a pressure-gas cylinder and/or a gas generator and the mentioned activatable components is selected in particular in the case where the activatable components are to be activated almost simultaneously following the signal of a retarded-action fuse and/or acceleration fuse or sensor.

In this case, the connecting lines should be as short as possible and should be of large diameter. Consequently, primarily the interior of the upper support body (1), of the lower support body (4) or the seat back (3) could be considered for housing the pressure-gas cylinder and/or the gas container.

In a particularly preferred embodiment, not only the upper and lower lateral guides (5, 15) of the upper projecting part

(14) and the lower support body (4) can be expanded in the manner of an airbag, by way of a pressure-gas cylinder or gas generator coupled with a retarded-action fuse. But also, with this embodiment, additionally the entire front (9) of the upper support body (1) and the back (facing the rear of the vehicle) of the upper support body (1) can be turned outward airbag-like, whereby an exact cushion shape may be maintained by fitting retaining lines or retaining straps at the interior walls, by the choice of various wall thicknesses or by fitting wall reinforcements.

In particular with the use of the head restraint according to the invention in conjunction with a pressure-gas cylinder and/or gas generator coupled to a retarded-action fuse or an acceleration fuse or sensor, it has been shown to be particularly advantageous not to design the projecting part (14), the upper and lower lateral guides (5, 15) and the lower support body (4) individually, but instead as a one-piece combination. In this it is of course possible, for example for reasons of cost, to do without the integration of some components.

A particular advantage of the head restraint according to the invention is that in a very simple embodiment it can easily be retrofitted.

Thus for example in a hood-like covering matching the shape of the standard-equipment seat and if applicable the standard-equipment head restraint, a projecting part (14), upper and, if need be, lower lateral guides (5, 15) as well as a lower support body (4) can be worked in in pockets sewn accordingly, at the described positions. These can be either solid or expandable.

Alternatively, the back of the activatable components may comprise a means which adheres to the surface of the upper support body (1) and/or the seat back (3). The activatable components can thus be retrofitted by simple pressing-on. In particular, velcro-fastener-like means are suitable for this type of fastening.

Furthermore, the use of a press-stud strip, a velcro-fastener strip or a zip-fastener has proven particularly suitable for fastening the lower support body (4) to the underside or front of the upper support body (1).

Figure 3:
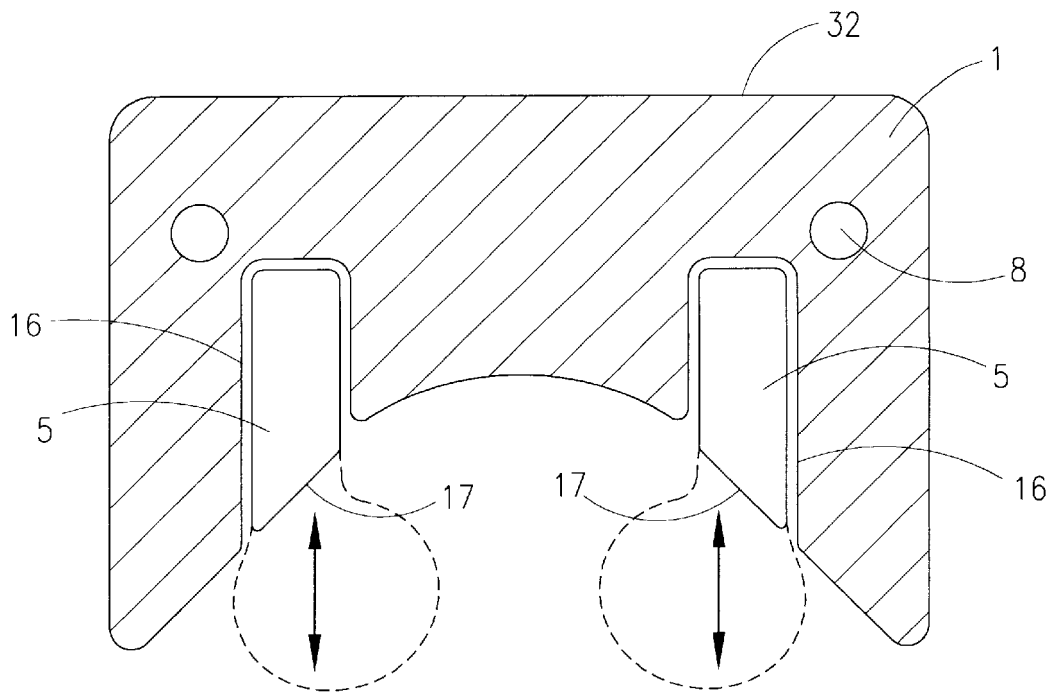
FIG. 3 a cross section of a head restraint according to the invention, along the line A—A in FIG. 2.
Figure 4:
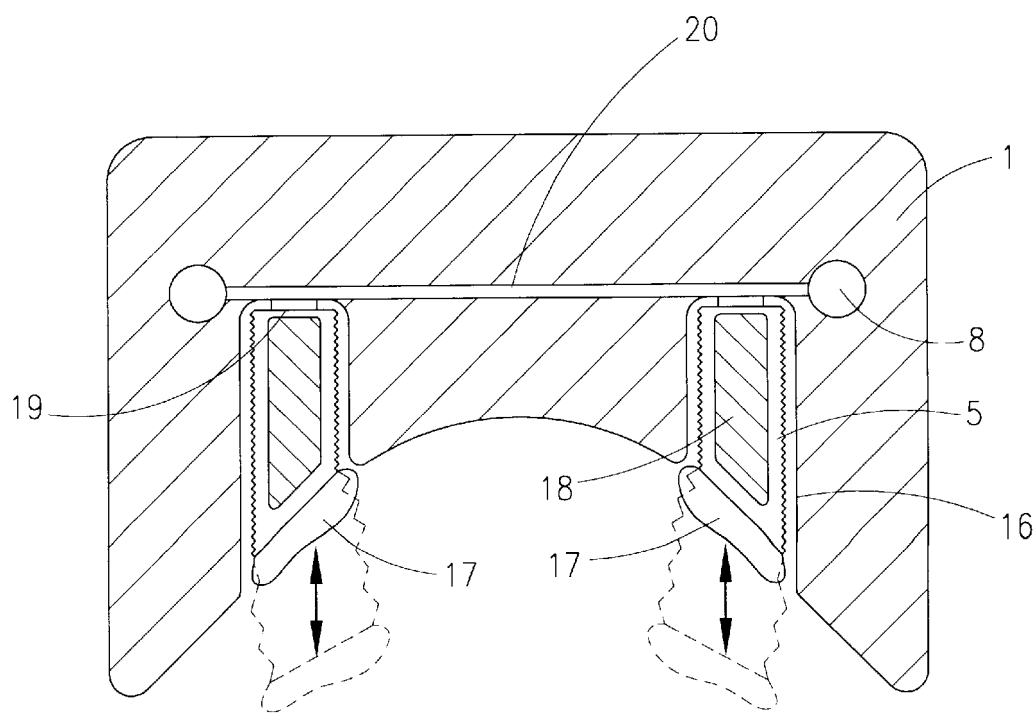
FIG. 4 a cross section of an other embodiment of the head restraint according to the invention, along the line A—A in FIG. 2.
Figure 5:
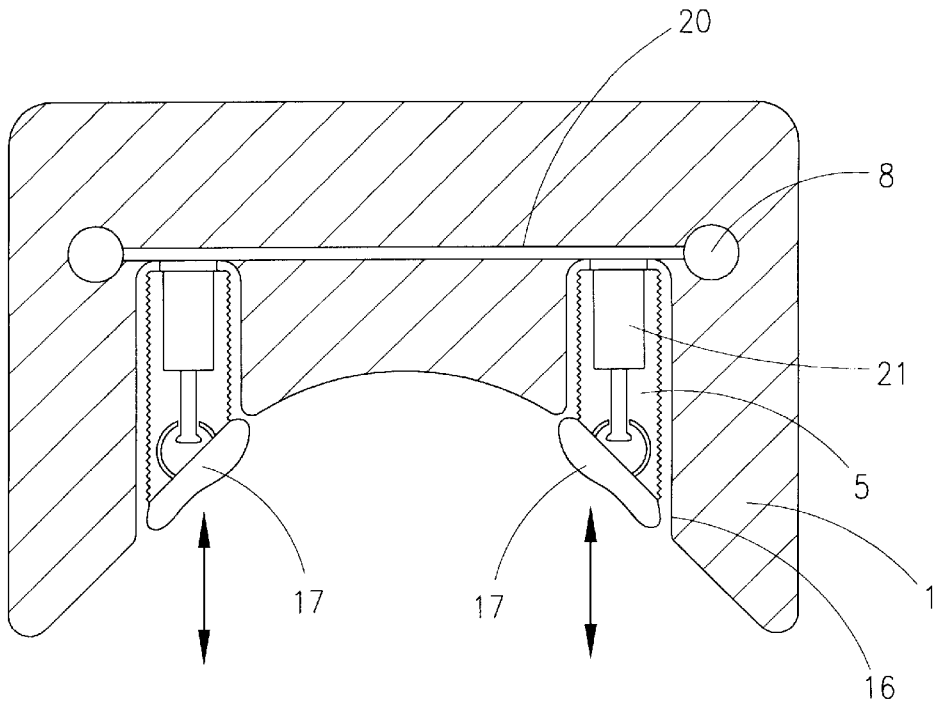
FIG. 5 a cross section along the line A—A in FIG. 2 of a further embodiment of a head restraint according to the invention.

Of course it is possible, with a suitable drill, hob or thermocutter, to provide recesses (16) in the upper and/or lower support body (1, 4); into which the upper and/or lower lateral guides (5, 15) and if desired, the upper projecting part (14) may be inserted (see FIGS. 3, 4 and 5).

FIGS. 3, 4 and 5 show cross sections along the line A—A in FIG. 2, of various embodiments.

FIG. 3 shows two recesses (16), in the upper support body (1), at equal height but horizontally spaced apart from each other, for accommodating two upper lateral guides (5). Here, the lateral guides (5) are preferably made from a highly-elastic, gas-proof material such as rubber, caoutchouc, latex or neoprene. In their normal position they are shaped as shown by the solid line, the shape essentially matching the rectangular recesses (16) and the frontal bevelling of the recessed head space (32). By way of one or several supply lines (not shown in this or subsequent diagrams), the lateral guides (5) can be filled with any medium as desired. Thanks to the highly-elastic construction, at least of the preferably bevelled frontal area (17), this can then open up balloon-like as shown in the dashed line.

In FIG. 4 the front areas (17) of the lateral guides (5) are designed with a larger area and are adapted to the round shape of the head, thus in particular increasing comfort. The lateral areas can be of bellow-like structure. In order to receive a particular normal position, a respectively shaped block (18) made from an elastic material, e.g. from foamed material, may be provided in the interior of the lateral guide (5). If need be, stiffening, or for example telescope-like guide elements to avoid unintended tilting of the expanded lateral guide (5), can be integrated in its sidewalls or provided in its interior space.

In order to improve tilt resistance of the expanded lateral guide (5), the rear (19) of the lateral guides (5) can be connected to a carrier plate (20). A non-positive tilt-safe connection may for example be made by bonding, by providing velcro closures or by interlocking of respectively constructed protrusions on the one hand and matching recesses on the other hand, for example in the shape of snap connections or press studs. As shown in FIG. 4, this snap connection can be fitted directly to the vertical holding element(s) (8).

The lateral guides (5) of FIG. 5 are moved by hydraulically, pneumatically or electrically-operated lifting cylinders (21) or by respective servo motors. The connections between the large frontal areas (17) and the front ends of the lifting cylinders (21) are preferably shaped in the way of ball-and-socket joints, as shown. The use of lifting cylinders (21) anchored to the carrier plate (20) opens up the possibility of matching the lateral guides (5) particularly exactly to the shape of the head, combined with particularly good tilting stability in the expanded state.

This is to point out again that all embodiments concerning the upper lateral guides (5), equally apply to the lower lateral guides (15).

Figure 7:
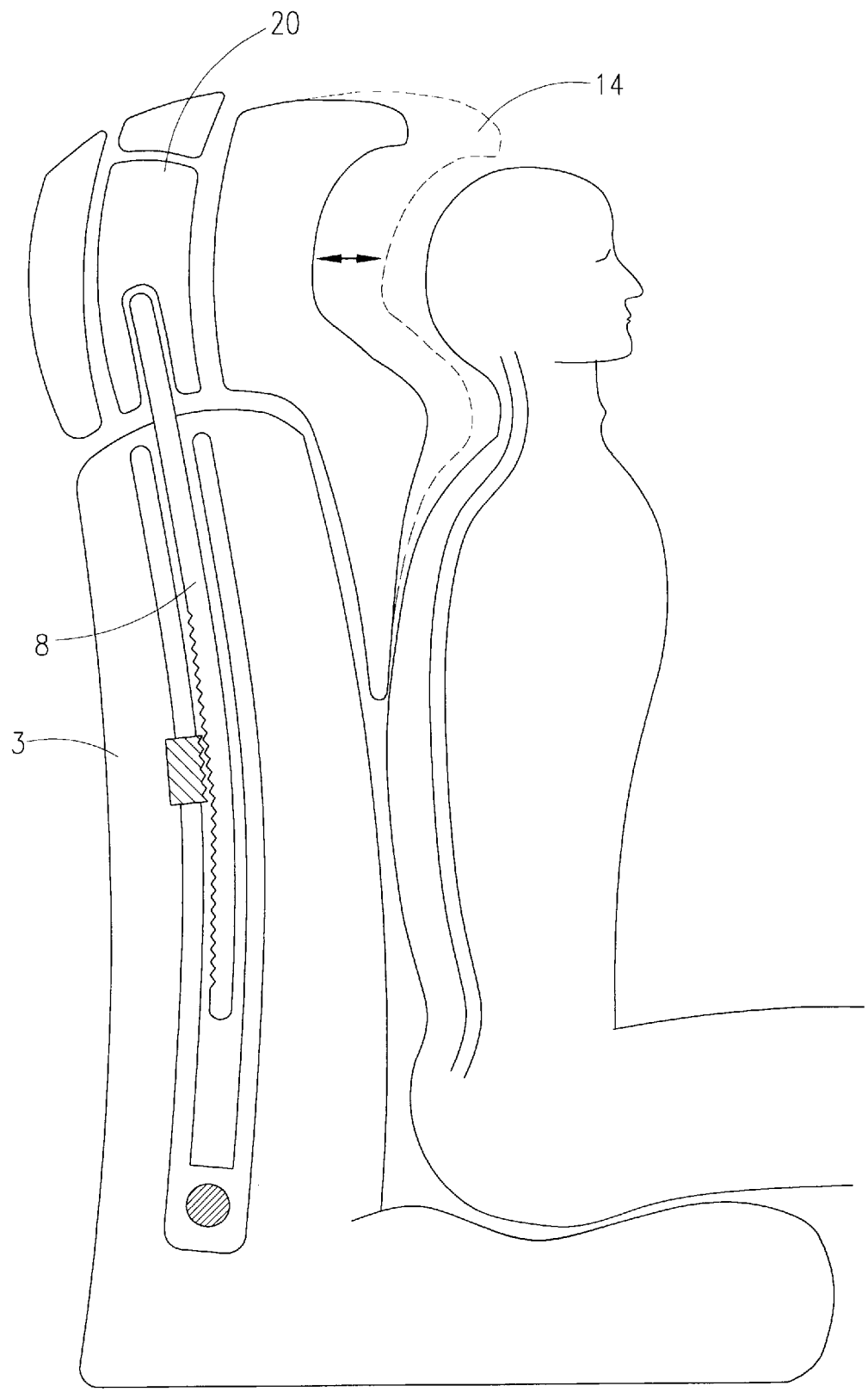
FIG. 7 a cross section along the vertical centre line in FIG. 2 of a head restraint according to the invention with a one-piece combination of an upper and lower support body.

FIG. 7 represents a cross section along the vertical centre line (10) in FIG. 2 of a particularly preferred embodiment of the head restraint according to the invention. In this embodiment at least the upper support body (1) and the lower support body (4) are constructed in the shape of a one-piece combination.

When viewed from the side, the front contour of this combination is essentially S-shaped. The solid line shows its non-expanded normal condition; and the dashed line shows its expanded or partially-expanded condition.

This figure also particularly clearly shows the preferred shape of the rear carrier plate (20). In lateral view, the lower part of the carrier plate (20) first extends straight upwards according to the shape of the holding elements (8). From about the middle of the carrier plate (20) it can be slightly curved forward in the direction of travel. This curvature has the advantage that during the backward whiplash-like movement of the torso following a frontal collision or a rear-end collision, the torso cannot easily slide along the seat back which is usually somewhat inclined backwards, thus counteracting straining the neck by a head restraint engaging too low. This curvature also results in the front area of the head restraint according to the invention being approximately in the shape of the back of the head, in the non-expanded normal position already, and that for this reason the material thickness of the frontal area, in particular at the upper and lower ends, can be less when compared to a carrier plate (20) which is straight throughout.

Of course it is also possible to do without this curvature and to construct the carrier plate (20) straight throughout, when viewed from the side.

Figure 8:
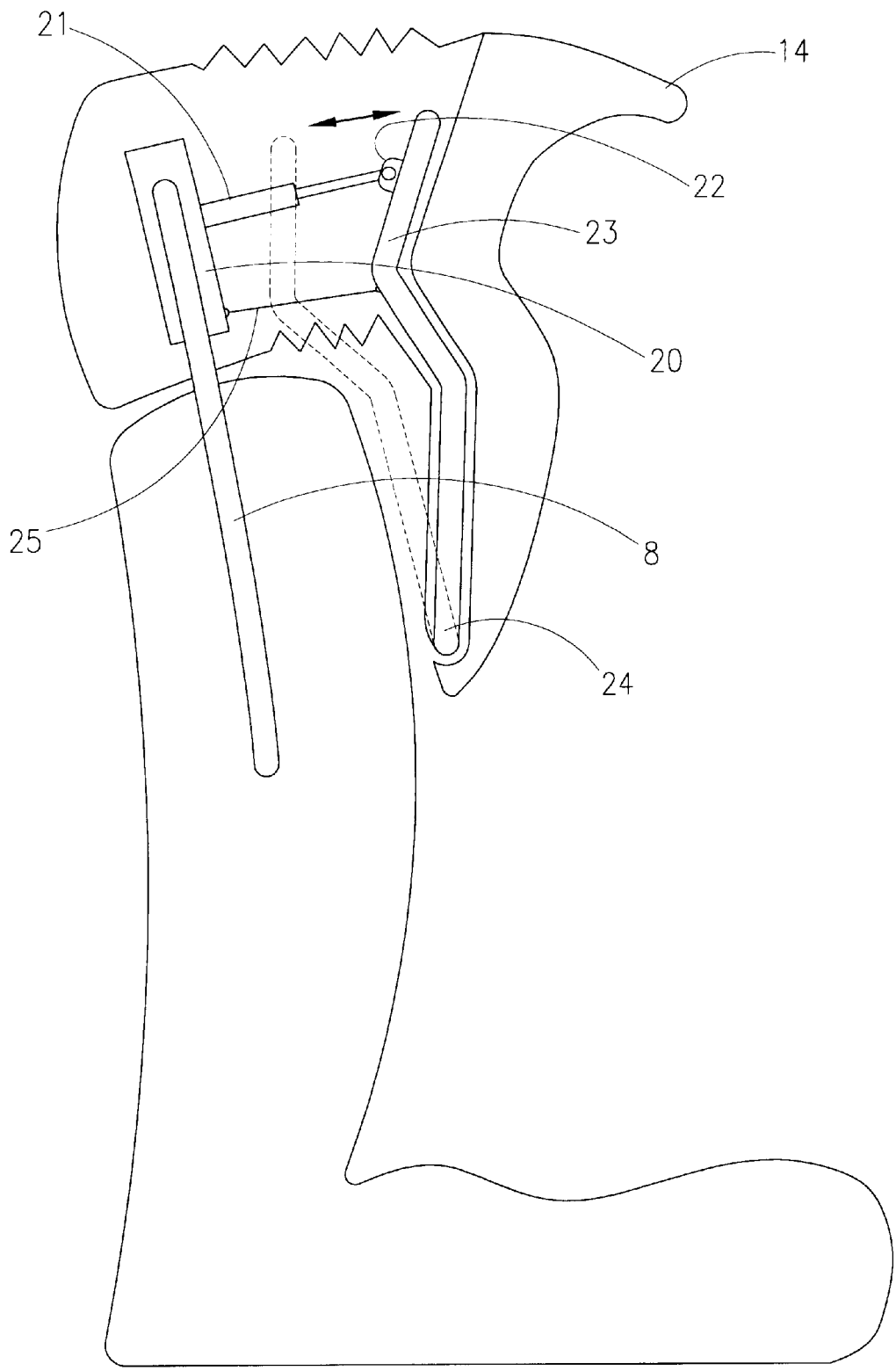
FIG. 8 a cross section along the vertical centre line in FIG. 2 of a head restraint according to the invention with a one-piece combination of an upper and lower support body that can be hinged forward.

FIG. 8 shows a possibility for the technical realisation of the forward movement of the combination consisting of an upper and lower support body (1, 4), as shown in FIG. 7. For example, on a rear carrier plate (20) located between the vertically protruding holding elements (8), a hydraulically, pneumatically or electrically-activatable lifting cylinder (21) can be provided either rigidly or hingeably attached. The front end of the lifting cylinder is connected to a front carrier plate (23) by way of a ball-and socket joint (22).

When viewed from the side, the front carrier plate (23) has a straight upper section which in the non-activated normal position is essentially vertical. Joining the upper straight section is a lower section which is curved forward. The curvature of the lower section is such that it covers the front upper edge of the seat back (3) with a slight curve and that the lower end (24) of the lower section lightly rests against the front of the seat back (3), preferably somewhat below the height of the cervical lordosis. If the lifting cylinder (21) is activated, then the front carrier plate (23) together with the above mentioned components fitted to it, of the head restraint according to the invention, is moved forward.

In order to avoid unintentional forward swinging of the lower part of such a head restraint, in the case of a frontal collision, the attachment point of the lifting cylinder (21) can be selected low enough for the centre of gravity of the front carrier plate (23) to be located above this attachment point. As an alternative, or in addition to this, it is possible to attach a safety cord (25), for example between the vertical holding element (8) and the lower section of the front carrier plate (23).

Instead of the lifting cylinders (21), an airbag can be employed which can be filled by a gas generator or a pressure-gas cylinder.

Figure 9:
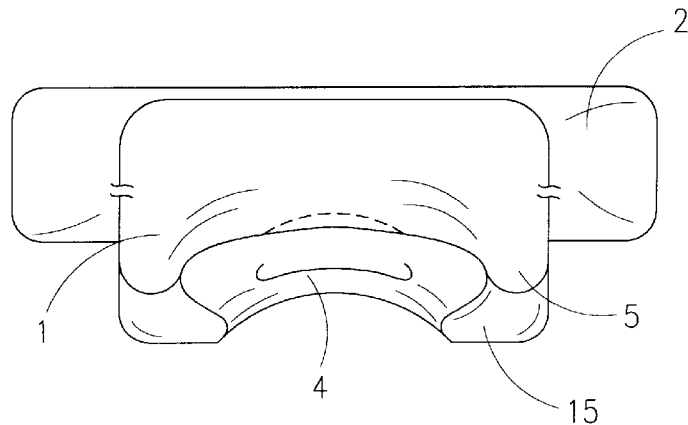
FIG. 9 a top plan view of a head restraint according to the invention with upper and lower lateral guides and a lower support body.

FIG. 9 is a diagrammatic top view onto a head restraint according to the invention, with a one-piece combination of the upper support body (1) and the lower support body (4). The upper and lower lateral guides (5, 15) too, are harmoniously integrated into this combination. The upper projecting part (14) is not shown.

From what has been mentioned so far it is evident that the activatable components (upper projecting part (14), upper lateral guides (5), lower support body (4) and lower lateral guides (15)) can be activated by pumps or piston stroke cylinders or the like.

Figure 10:
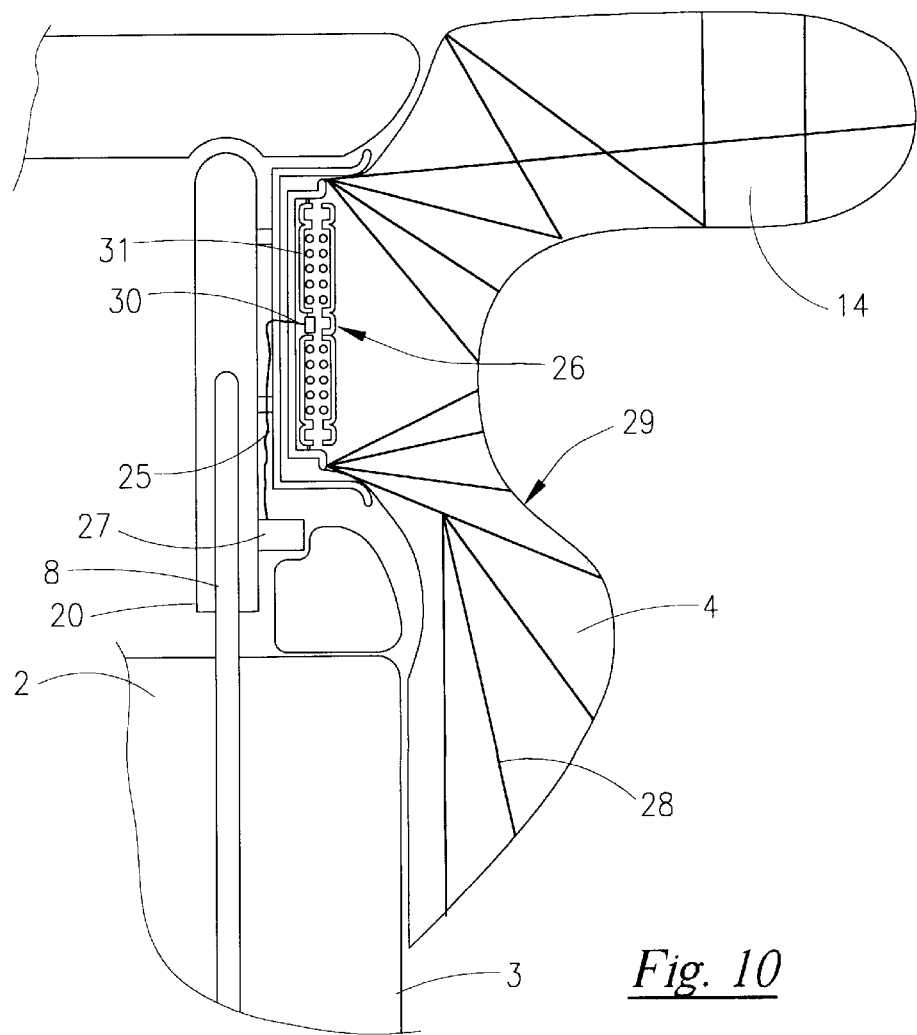
FIG. 10 a cross section along the vertical centre line of a head restraint according to the invention, with an expanded air bag.

FIG. 10 shows that all these components are activatable at the same time by a gas generator. In a dish-like generator carrier (25), which for example may be attached to the rear carrier plate (20), a commercially-available gas generator (26), for example filled with sodium acid pellets (31), is connected to a mechanical or electrical (27) release sensor mechanism, for example via a priming cap (30) filled with black powder. If a pre-set acceleration threshold value is exceeded, the release sensor mechanism triggers the gas generator (26). Of course, as an alternative to a gas generator, a pressure-gas cylinder can be employed. The gas generated in this way completely inflates the airbag in the shortest of time (approx. 10 to 60 milliseconds). As a result, the airbag (29) assumes the shape shown in FIG. 10 comprising an upper roof-shaped projecting part (14), if need be, two upper lateral guides (5), not shown here, a lower support body (4) and if need be two lower lateral guides (15) also not shown, in a one-piece combination. In order to ensure that the airbag assumes the desired shape, preferably retaining straps (28) of appropriate length are fitted in suitable positions to the interior walls of the airbag (29) (see FIG. 10). As a rule, the airbag (29) is made from a woven yarn, for example polyamide 6.6 (nylon). A typical fabric is 940 dtex nylon, fabric set 12/12 threads/cm. Coated or uncoated woven materials may be used which are gas proof or gas permeable. Preferably, the rear of the upper support body (1), facing the rear of the vehicle, is constructed in such a way that it can deploy a pillow-shaped airbag inflated by a gas generator or a pressure-gas cylinder. If need be, this reaches down as far as the knee area and laterally far enough that it either touches the side of the vehicle or the air bag of the neighbouring seat. In the case of a frontal collision, this effectively prevents passengers seated in the back being catapulted forward, past the head restraint.

Figure 11:
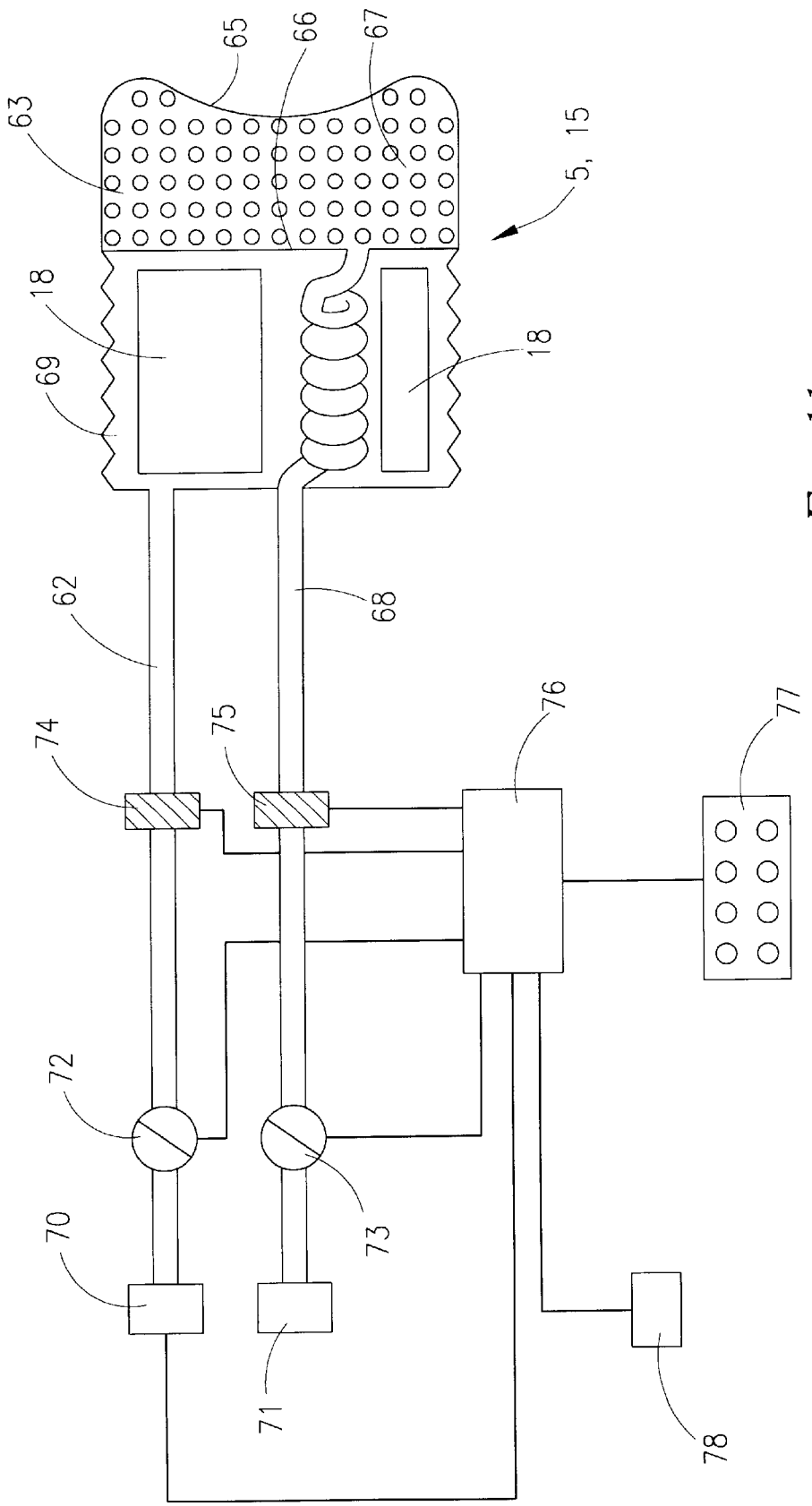
FIG. 11 a diagrammatic representation of a lateral guide with a frontal chamber filled with solid spherules as well as a block diagram of the supply and control arrangement.

A further characteristic of a preferred embodiment of the head restraint according to the invention consists of the frontal areas, in particular of the upper support body (1), the lower support body (4) and the lateral guides (5, 15), if need be, being constructed in such a way that by lightly pressing the head or the neck area against them, they assume the desired shape and that this shape can subsequently be "frozen" and stored in this way. In a manner representative for all other activatable components, FIG. 11 shows such an insulated lateral guide (5, 15) whose location within the head restraint according to the invention is shown in FIG. 4. The respective frontal area comprises two layers, with the layers (65, 66) spaced apart approximately 0.5 to 10 cm from each other. Embedded between the two layers (65, 66) are small solid particles (63) such as polystyrene spherules. If there is surrounding pressure between the two layers (65, 66), the polystyrene particles (63) can be moved against each other effortlessly. Once they have been positioned properly by lightly pushing the neck or head against them, slight negative pressure is created and maintained in this space (67) by way of a pipe (68). The polystyrene spherules are now pushed against each other by the surrounding air pressure and can be moved against each other only with difficulty. In this way, the desired shape of the frontal are is "frozen".

Instead of creating negative pressure in the chamber (67), a gel or a resin or similar for fixing the spherical particles (63) can be introduced by way of the connection (68).

It is also possible to provide an electrically-heatable resistor wire in the chamber (67) which can heat a thermoplastic material present therein to the extent that it becomes deformable and can be exactly fitted to the head and/or neck region. By subsequent cooling, the desired shape is "frozen". Preferably, the thermoplastic fill material of the front chamber (67) is at least somewhat elastic even in its cooled state.

The connection (68) of the front chamber (67) is preferably made expandable in longitudinal direction, for example in the shape of a spiral, so that during expansion of the rear chamber (69), in which a body made of foamed material (18) is accommodated, the positive or negative pressure in the front chamber (67) can be maintained.

As shown in FIG. 11, the connection (62) of the rear chamber (69) and the connection (68) of the front chamber (67) can be communicating with the same pump or with different pumps (70, 71). In order to avoid permanent operation of the pumps (70, 71), stop valves (72, 73), which are closed once the desired pressure is reached or which close automatically, can be provided in the connecting lines (62, 68). In a particularly preferred embodiment, pressure measuring devices (74, 75) are arranged in line between the respective chambers (67, 69) and the respective stop valves (72, 73).

The pumps (70, 71), the stop valves (72, 73) and the pressure measuring devices (74, 75) as a rule are constructed in such a way that they can be electrically operated or controlled. In this case it is particularly advantageous, for control purposes, to connect each of these components with a central processing unit (76). Also connected to this central processing unit (76) is an input device (77), for example an ensemble of keyboard-shaped operating elements. In addition, the pumps (70, 71), the stop valves (72, 73), the pressure measuring devices (74, 75) and the central processing unit (76) are connected to a source of electrical energy.

By way of the keyboard (77) the desired values for pressure conditions in the chambers (69, 67) can be entered.

In this case, the pressure measuring devices (74, 75) determine the actual value and transmit it to the central processing unit (76). There, the actual value is compared to the desired value.

If the actual value is below the desired value, the central processing unit (76) activates the respective pump (70, 71) and opens the respective stop valve (72, 73) until such time that the actual value reported by the pressure measuring device (74, 75) to the central processing unit (76), corresponds to the desired value. If the actual value corresponds to the desired value, then the central processing unit (76) closes off the respective stop valve (74, 75) and switches off the respective pump (70, 71). If the actual value is above the desired value, then the central processing device (76) opens the stop valve (73, 72) until such time as the actual value corresponds to the desired value.

If need be, the central processing unit (76) is communicating with a memory (78). In this case it is possible to store in the memory (76) desired values relating to a person and to cause automatic setting of the respective actual value for example by entering an identification number or a numeric code. In a particularly preferred embodiment of the present invention, all or several of the activatable components which require positive pressure for activation, are communicating with a distributor valve controlled by the central processing unit, each by way of its own supply line. If need be, in each of these supply lines there is a pressure measuring device linked to the central processing unit (76). From the central distributor valve there is but a single line to the only pump (70) supplying positive pressure. These requirements are analogous for those components which need negative pressure for activation.

It is now possible, for each authorised user to store in the memory (78) a set of desired values for several activatable components. In the case of a change of driver, the head restraint according to the invention can very simply and quickly be automatically adjusted to the individual by entering a code.

On the other hand, by way of the keyboard-shaped input device (77), the pumps (70, 71), if need be together with the stop valves (72, 73) can be controlled directly. In this case, no pressure measuring devices are required. In order to overload the pumps (70, 71) and to avoid damage to the walls (60) of the cell, the use of an overload protection for the pumps (70, 71) is recommended. In a particularly preferred embodiment, the keyboard-shaped input device (77) is integrated into the keyboard of that input device which is used to control the other functions of the seat (for example height adjustment of the head restraint; height adjustment of the seat, seat air conditioning in seat cushion and backrest; seat heating; inclination adjustment of the seat surfaces, elongation adjustment of the seat surfaces, depth adjustment of the seat surfaces, lumbar support; tilt travel adjustment and seat back inclination adjustment). In this case, the input device (77) is preferably on the seat, for example beside the thigh support; on the centre console between the seats, or on the dashboard.

In the introduction it was mentioned that the upper support body (1) is height-adjustable in relation to the upper edge (2) of the seat back (3).

Height adjustability of the upper support body can principally occur in two ways; either the vertical holding element (8) is arranged vertically slidable in the seat back (3), or the upper support body (1) is vertically slidable on the fixed holding element (8).

In the first case the holding element (8) can for example be guided in a vertical guide tube in the seat back. Vertical movement of the holding element (8) is preferably by a hydraulically or pneumatically driven lifting cylinder, arranged in the lower part of the guide tube encompassing the holding element (8), and acting vertically upwards As an alternative to this, the holding element (8) can also be moved vertically by a rotating screw-type gear which interacts with a toothed section of the holding element (8).

In a particularly preferred embodiment of the present invention, in the case of accelerating forces above a certain threshold value, the upper support body (1) can instantly be moved into a particularly high-set final position. For this purpose, the lifting cylinder mentioned, in the guide tube, communicates with a separate gas generator or pressure-gas cylinder, each of which is coupled to a respective release sensor mechanism. The holding element (8) can essentially be guided in a gas-proof way in the guide tube. In this case, the gas generator or the pressure-gas cylinder interact with the lower section of the guide tube. Moving up the upper support body (1) immediately upon encountering respective acceleration forces, provides a particularly effective means of avoiding whiplash trauma.

Apart from this, known height adjustment mechanisms can be used which for example cause locking of the holding element (8) at a defined height, for example by means of a spring clamp anchored to the upper edge (2) of the seat back (3); this spring clamp interacts with a snap-in locking device of the holding element (8) in this area.

In the second case, the upper support body (1) can also be vertically moved in relation to the fixed holding element (8) by a pneumatically or hydraulically operated lifting cylinder arranged in the lower part of the guide tube encompassing the upper end of the holding element (8), and acting vertically. In this case, too, the lifting cylinder can communicate with a gas generator or pressure-gas cylinder connected to a respective release sensor mechanism, for instant movement into a high-set position of the upper support body (1) in the case of encountering acceleration forces above a particular threshold value.

If a purely mechanical height adjustment of the head restraint according to the invention is required, then this can easily be attained by fitting a movable locking pin which interacts with index notches by way of a tilting mechanism.

Preferably in either case the lifting cylinders are provided with means which communicate with the central processing unit (76) and signal to it the actual height of the upper support body (1). Such means can for example be flow meters.

The details mentioned so far show that the entire head restraint according to the invention, including its height adjustment, can be operated pneumatically. To this effect, a central compressed-air tank can be provided, for example below the driver's seat. If need be, this tank can be equipped with a tire valve which allows easy refilling of the tank at a petrol station.

Media which are particularly suitable for filling the activatable components include gases such as for example air, nitrogen, halogenated hydrocarbons such as chlorofluorocarbons (for example Frigen), carbon dioxide or carbon monoxide; liquids such as water, oils, alcohols, liquids with a particularly high or a particularly low viscosity, thermoplastic liquids or duroplastic liquids (resins); solids such as small spherical particles for example made of polystyrene; powders or mixtures of these, such as gels, foams or similar.

Dependent on the other activatable components, or independent of these, in principle each activatable component can be filled with the same medium or with a different medium from the other activatable components.

As a rule, accommodation for the pumps (70, 71), of the stop valves (72, 73) of the pressure measuring devices (74, 75) and the central processing unit (76) is in the spacious seat back. If however miniaturised components (which at present are still somewhat expensive) are used, then it is quite possible to accommodate these centrally in the interior of the head restraint according to the invention. In order to accommodate the above-mentioned components, it is possible, in a vertical carrier plate (20) provided between the front and the rear areas of the head restraints, to have recesses matching the shape of the components. It is of course also possible to fix the components onto the surface of the carrier plate (20). In order to avoid damage to the cell by protruding components, preferably padding, for example made from foamed material, is provided between the components and the side of the cell facing the carrier plate (20). In particular with a view to simple upgradability, accommodating the components exclusively within the head restraint itself is a big advantage.

Power supply to the central processing unit (76), the pumps (70, 71), the stop valves (72, 73) and if need be the pressure measuring devices (74, 75) and the motors for adjusting the height of the holding elements (8) can be from a battery or an accumulator which is removably housed in the head restraint too. Of course a power supply by way of a battery or accumulator built into the seat-back is possible. If need be, a power supply from the vehicle's electrical system is particularly advantageous.

If individual adaptability of the head restraint, for example for reasons of weight, space or cost is not considered necessary, then it is possible to do without pumps (70, 71) permanently linked to the connections (62, 68) of the chambers (69, 67). In this case, the chambers are filled once with a separate mobile pump to such an extent that the shape and absorption characteristics of the cell are in accordance with the desired value. Subsequently, the connecting lines (62, 68) are removed from the separate pump and sealed, either reversibly or irreversibly.

The material of the walls of the activatable components is preferably liquid-proof and/or gas-proof, flexible and at least somewhat extendable.

Preferably the head restraint according to the invention with all its components is covered by a tightly-fitting elastic protective cover which can be colour-matched to the vehicle upholstery and consist of a skin-friendly material with good breathing properties. If needed, it can comprise designated break-off places in the shape of tearing seams.

What is claimed is:

1. A head restraint for a seat back of a seat, comprising:
    a cylindrical, upper support body in the extension of the seat back above an upper edge of the seat back of the seat (3) at a head height of a seated person, wherein said upper support body includes a first longitudinal axis aligned horizontally and parallel to a second longitudinal axis of said seat back of the seat, wherein an underside of the upper support body is above the upper edge of the seat back of the seat, and wherein said upper support body includes a front portion having at least two horizontally spaced apart means for laterally supporting the head of the seated person; and
    a lower, cylindrical support body integrated into the lower end of the front of said upper support body and positioned at a cervical lordosis of said seated person in said seat, wherein said lower support body is adapted to support the cervical spine of said seated person, and wherein said lower, cylindrical support body contains a semi circular cross-sectional area and wherein said lower support body includes a third longitudinal axis aligned horizontally and parallel to said first longitudinal axis of said upper support body, and wherein said lower support body includes at least two horizontally spaced apart means for laterally supporting the cervical spine.

2. The head restraint according to claim 1, wherein said upper support body further includes a projecting portion extending in a direction toward said seated person.

3. The head restraint according to claim 2, wherein said projecting portion is adjustably variable in size and shape.

4. The head restraint according to claim 2, wherein said means for laterally supporting the head and said means for laterally supporting the cervical spine are adjustably variable in size and shape.

5. The head restraint according to claim. 1, wherein said upper support body and said lower support body include wall reinforcement means for forming and maintaining the shape of said upper support body and said lower support body.

6. The head restraint according to claim 1, wherein said upper support body includes a deformable interior volume which can be filled with an external medium whereby the size and shape of said upper support body is controlled by the presence of said external medium within said interior volume.

7. The head restraint according to claim 1, wherein said lower support body includes a deformable interior volume which can be filled with an external medium whereby the size and shape of said lower support body is controlled by the presence of said external medium within said interior volume.

8. The head restraint according to claim 1, wherein said upper support body includes propelling means for propelling at least a portion of said upper support body in a direction toward said seated person.

9. The head restraint according to claim 8, wherein said propelling means is selected from the group consisting of a pump, a pressure-gas cylinder and gas generator.

10. The head restraint according to claim 1, wherein said lower support body includes propelling means for propelling at least a portion of said lower support body in a direction toward said seated person.

11. The head restraint according to claim 10, wherein said propelling means is selected from the group consisting of a pump, a pressure-gas cylinder and gas generator.

12. The head restraint according to claim 1, wherein said upper support body and said lower support body are constructed as a single unit having an S-shaped contour.

13. The head restraint according to claim 1, further comprising a hood cover matched to the shape of the upper support body (1) and the upper portion of the seat back of the seat, wherein said hood-like cover includes activatable portions.

14. The head restraint according to claim 1, further comprising an inflatable airbag attached thereto, wherein said airbag includes at least two means for laterally supporting a portion of the body of said seated person.

15. The head restraint according to claim 1, further comprising a plurality of activatable portions, wherein said activatable portions are constructed in two layers, wherein a plurality of solid spherules are disposed between said layers, and wherein the space between said layers may be subjected to a pressure differential.

16. The head, restraint according to claim 1, further comprising a plurality of activatable portions, wherein said activatable portions are in communication with a central processing unit, a memory storage unit, and an input device, whereby said activatable portions can be sized and positioned in response to input provided by said seated person.

17. The head restraint according to claim 1, further comprising at least one activatable portion, wherein said activatable portion is caused to immediately elevate said head restraint to a predetermined position upon detection of a predetermined threshold amount of acceleration.

* * * * *